US010630546B2

(12) United States Patent
Baxa et al.

(10) Patent No.: US 10,630,546 B2
(45) Date of Patent: Apr. 21, 2020

(54) DISTRIBUTED TOOL FOR DETECTING STATES AND STATE TRANSITIONS IN REMOTE NETWORK MANAGEMENT PLATFORMS

(71) Applicant: ServiceNow, Inc., Santa Clara, CA (US)

(72) Inventors: Olivier Baxa, Kirkland, WA (US); Paul Wang, Bothell, WA (US); Vincent Seguin, Encitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 273 days.

(21) Appl. No.: 15/713,089

(22) Filed: Sep. 22, 2017

(65) Prior Publication Data
US 2019/0097885 A1    Mar. 28, 2019

(51) Int. Cl.
*G06F 15/16*    (2006.01)
*H04L 12/24*    (2006.01)
*H04L 12/26*    (2006.01)

(52) U.S. Cl.
CPC ...... *H04L 41/0816* (2013.01); *H04L 41/0681* (2013.01); *H04L 41/0695* (2013.01);
(Continued)

(58) Field of Classification Search
CPC .................................................. H04L 41/0816
(Continued)

(56) References Cited

U.S. PATENT DOCUMENTS

2004/0059544 A1 *  3/2004  Smocha .............. G06F 11/3409
                                                      702/182
2011/0119374 A1 *  5/2011  Ruhl ....................... G06Q 10/06
                                                      709/224
(Continued)

FOREIGN PATENT DOCUMENTS

WO    WO-2017055607 A1 *  4/2017  ............. H04H 60/33

OTHER PUBLICATIONS

Tom Valine, Argus: Time-Series Monitoring and Alerting (downloaded from https://engineering.salesforce.com/argus-time-series-monitoring-and-alerting-d2941f67864 on Aug. 16, 2017).

*Primary Examiner* — Hamza N Algibhah
(74) *Attorney, Agent, or Firm* — Fletcher Yoder PC

(57) ABSTRACT

A computing system may involve a time-series server device and computing devices. The time-series server device may be configured to: receive and store pre-defined trigger configurations; receive and store time-series data, wherein the pre-defined trigger configurations define states and/or state transitions for the received time-series data; apply, by way of a trigger engine, the pre-defined trigger configurations to the received time-series data to determine observed states and/or state transitions in the time-series data; and store, in transition storage, representations of the observed states and/or state transitions. One or more applications operating on computing devices may be configured to: transmit the pre-defined trigger configurations to the time-series server; transmit a stream of the time-series data to the time-series server; and repeatedly poll and receive, by way of a plurality of worker threads, the representations of the observed states and/or state transitions from the transition storage.

18 Claims, 11 Drawing Sheets

(52) U.S. Cl.
CPC ...... *H04L 41/0866* (2013.01); *H04L 41/0893* (2013.01); *H04L 43/0817* (2013.01); *H04L 41/082* (2013.01); *H04L 41/0843* (2013.01); *H04L 41/0853* (2013.01)

(58) Field of Classification Search
USPC .......................................................... 709/221
See application file for complete search history.

(56) References Cited

U.S. PATENT DOCUMENTS

| | | | |
|---|---|---|---|
| 2012/0221150 A1* | 8/2012 | Arensmeier | G05B 23/0224 |
| | | | 700/276 |
| 2013/0204535 A1* | 8/2013 | Kapoor | G16H 50/50 |
| | | | 702/19 |
| 2016/0117916 A1* | 4/2016 | Hyun | G08B 29/12 |
| | | | 340/516 |
| 2016/0147955 A1* | 5/2016 | Shah | G06Q 10/06311 |
| | | | 705/3 |
| 2017/0185623 A1 | 6/2017 | Valine et al. | |
| 2017/0220938 A1* | 8/2017 | Sainani | G06N 20/00 |
| 2018/0373841 A1* | 12/2018 | Harpale | G06N 20/10 |
| 2019/0204818 A1* | 7/2019 | Ogata | G05B 23/0221 |

* cited by examiner

| MEASUREMENT | DATA | TRANSITION(S) |
|---|---|---|
| M0 | 68% | - |
| M1 | 72% | - |
| M2 | 70% | - |
| M3 | 79% | - |
| M4 | 86% | {T1,T2} |
| M5 | 83% | - |
| M6 | 92% | {T1,T2} |
| M7 | 90% | {T1} |
| M8 | 87% | {T1,T3} |
| M9 | 95% | {T1,T3} |
| M10 | 94% | {T1,T3} |
| M11 | 80% | - |
| M12 | 68% | - |
| M13 | 79% | - |

← 610

← 612

TIMESTAMP = {Sat Jul 29 02:16:57 2017}
TRANSITIONS = {T1,T3}
LAST 5 MEASUREMENTS = {86%, 83%, 92%, 90%, 87%}
CODE = {WARN1, "HIGH CPU"; WARN2, "SUSTAINED HIGH CPU"}

FIG. 6B

DISTRIBUTED TOOL FOR DETECTING STATES AND STATE TRANSITIONS IN REMOTE NETWORK MANAGEMENT PLATFORMS

BACKGROUND

Remote network management platforms allow computer networks to be managed by way of cloud-based devices and services. Advantageously, these architectures simplify the provisioning and administration of managed networks, and may provide mechanisms with which operational workflows can be defined and used. Nonetheless, computing devices disposed within the managed network, the remote network management platform, and/or the software executing thereon may become busy, overloaded, misconfigured, fail, or may otherwise transition to an undesirable state. Unless these states and state transitions are detected in a rapid fashion, at least some features and capabilities available to the managed network may become unavailable.

SUMMARY

Undesirable states and state transitions can take various forms. For instance, if processor utilization of a computing device transitions from below a threshold value (e.g., 95%) to above the threshold value, it is likely that the computing device is experiencing an unexpected (and undesirably high) processing load. Similarly, if processor utilization exceeds a threshold value (e.g., 85%) for a period of time (e.g., 30 seconds), it is likely that the computing device is overloaded or soon will become overloaded. Similar observations can be made about other computing resources, such as main memory utilization, disk utilization, network utilization, and so on.

But states and state transitions of interest are not limited to these scenarios. Other states or state transitions that may warrant monitoring include a computing device being unable to access certain other computing devices, the computing device exhibiting an unusually high number of errors when undertaking a particular activity, and/or the computing device not providing any state updates for a period of time. Other examples are possible.

In order to provide this information to a centralized location for further processing and storage, computing devices may be configured to periodically (or from time to time) report a current state and/or determine whether a particular state or state transition has occurred for that client device. If so, the client device may transmit an alert to a centralized management console, the alert indicating that a transition of interest has taken place. The management console would gather these alerts and provide indications of such to users (e.g., by way of email, text message, various indicia disposed upon a graphical user interface, and so on). Furthermore, it may be desirable for each computing device to store the time series of raw measurements that led to each alert, so that this data is available for a post-hoc root cause analysis.

In short, modern detection and management of computing device states and state transitions can place a significant burden on disparate types of computing devices to be able to process and store a large amount of measurement data. Some types of client devices, such as those with limited processing and storage capabilities, may be unable to do so to the desired extent. But even if a computing device has the capacity for these tasks, it is burdensome to require that such functionality be developed on all computing devices.

The embodiments herein introduce a new distributed architectural arrangement for the detection of states and state transitions. Rather than each computing device or platform being responsive for taking measurements, storing the measurement data, and determining in near-real-time whether the measurement data indications that a pre-defined state or state transition has occurred, these tasks are split between the computing devices and a time-series server device.

Particularly, the computing devices may still take measurements, but instead of storing this data, the computing devices may provide a stream of measurements to the time-series server device. The latter may be specifically arranged to be able to efficiently receive and store measurement data from a number of computing devices simultaneously. The time-series server device may also be arranged to efficiently apply pre-defined trigger configurations to this data, either in real time (e.g., synchronously) or in a best-effort fashion (e.g., asynchronously). The pre-defined trigger configurations may define states and/or state transitions of interest related to the measurements. The time-series server device may further be arranged to store representations of states and/or state transitions, which can be later retrieved by computing devices on the managed network or the remote network management platform. The computing devices may determine what to do in response to observed states and/or state transitions (e.g., log a warning message, alert a user, etc.).

Advantageously, this separation state reporting, detection of state and/or state transitions, and response to observed states and/or state transitions simplifies the monitoring and maintenance of computing devices. Furthermore, the time-series data (the stream of measurements) may be stored indefinitely by the time-series server device, allowing detailed post-hoc analysis of this data, as well as reducing the storage utilization of the computing devices. Moreover, the separation of functionality allows for intelligent scaling of both the computing devices and the time-series server device.

There are just a few of the many advantages of the embodiments described herein. Additionally advantages can be found in the following sections and throughout the accompanying drawings.

Accordingly, a first example embodiment may involve a time-series server device and computing devices. The time-series server device may be configured to: receive and store pre-defined trigger configurations; receive and store time-series data, where the pre-defined trigger configurations define states and/or state transitions for the received time-series data; apply, by way of a trigger engine, the pre-defined trigger configurations to the received time-series data to determine observed states and/or state transitions in the time-series data; and store, in transition storage, representations of the observed states and/or state transitions. One or more applications operating on computing devices may be configured to: transmit the pre-defined trigger configurations to the time-series server; transmit a stream of the time-series data to the time-series server; and repeatedly poll and receive, by way of a plurality of worker threads, the representations of the observed states and/or state transitions from the transition storage.

A second example embodiment may involve receiving and storing, by a time-series server device disposed within a remote network management platform, pre-defined trigger configurations. The second example embodiment may also involve receiving and storing, by the time-series server device, a stream of time-series data. The pre-defined trigger configurations may define states and/or state transitions for the received time-series data. The second example embodiment may involve applying, by way of a trigger engine of the time-series server device, the pre-defined trigger configurations to the received time-series data to determine observed states and/or state transitions in the time-series data. The second example embodiment may also involve storing, in transition storage of the time-series server device, representations of the observed states and/or state transitions. The second example embodiment may also involve receiving, by the time-series server device and from a client device, a request for the observed states and/or state transitions. The second example embodiment may also involve transmitting, by the time-series server device and to the client device, a representation of the observed states and/or state transitions.

A third example embodiment may involve transmitting, by a computing device, pre-defined trigger configurations to a time-series server device. The time-series server device may be disposed within a remote network management platform. The third example embodiment may also involve transmitting, by the computing device, a stream of time-series data to the time-series server device. The pre-defined trigger configurations may define states and/or state transitions for the received time-series data. The third example embodiment may also involve repeatedly polling and receiving, by way of one or more worker threads executing on the computing device, the representations of observed states and/or state transitions from the time-series server device. The observed states and/or state transitions may be determined by application of the pre-defined trigger configurations to the received time-series data.

In a fourth example embodiment, an article of manufacture may include a non-transitory computer-readable medium, having stored thereon program instructions that, upon execution by a computing system, cause the computing system to perform operations in accordance with the first, second, and third example embodiments.

In a fifth example embodiment, a computing system may include at least one processor, as well as memory and program instructions. The program instructions may be stored in the memory, and upon execution by the at least one processor, cause the computing system to perform operations in accordance with the first, second, and third example embodiments.

In a sixth example embodiment, a system may include various means for carrying out each of the operations of the first, second, and third example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B depicts applying pre-defined trigger configurations to data in a time series, in accordance with example embodiments.

DETAILED DESCRIPTION

Figure 1:
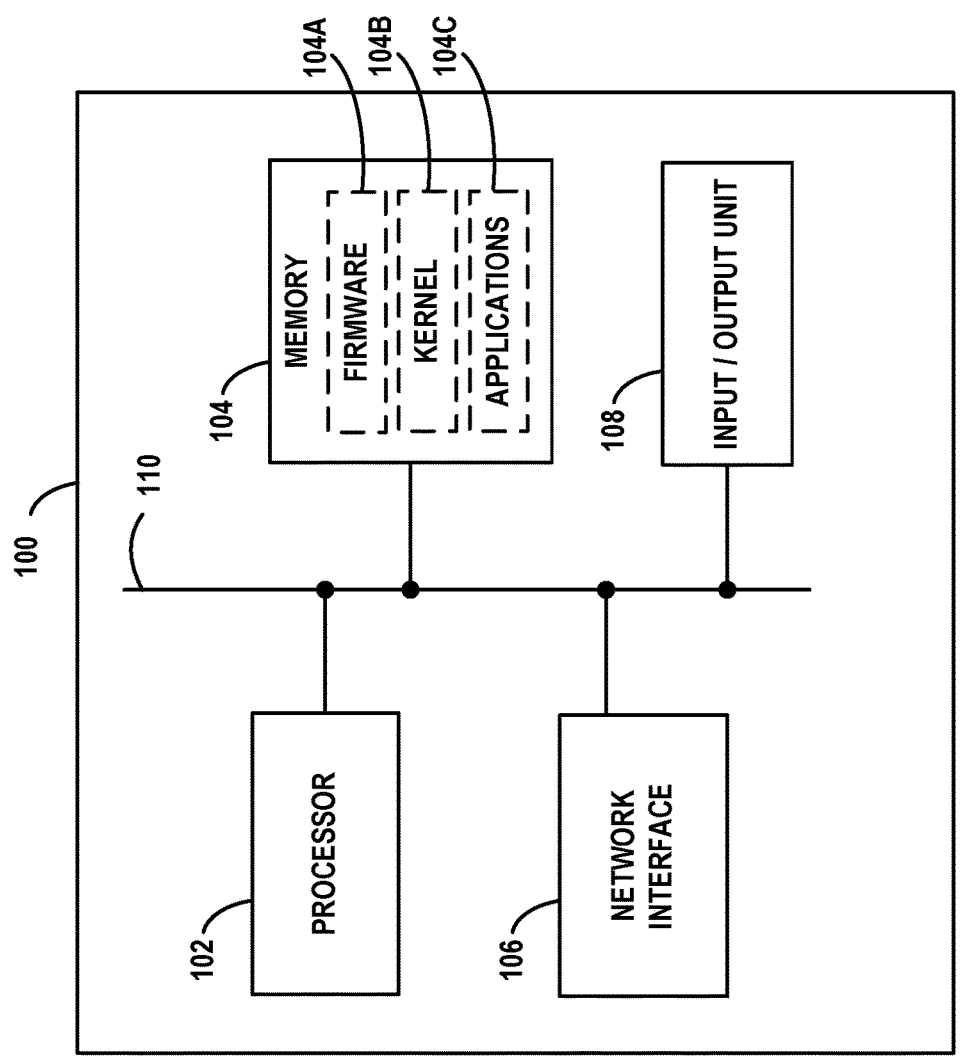
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input / output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
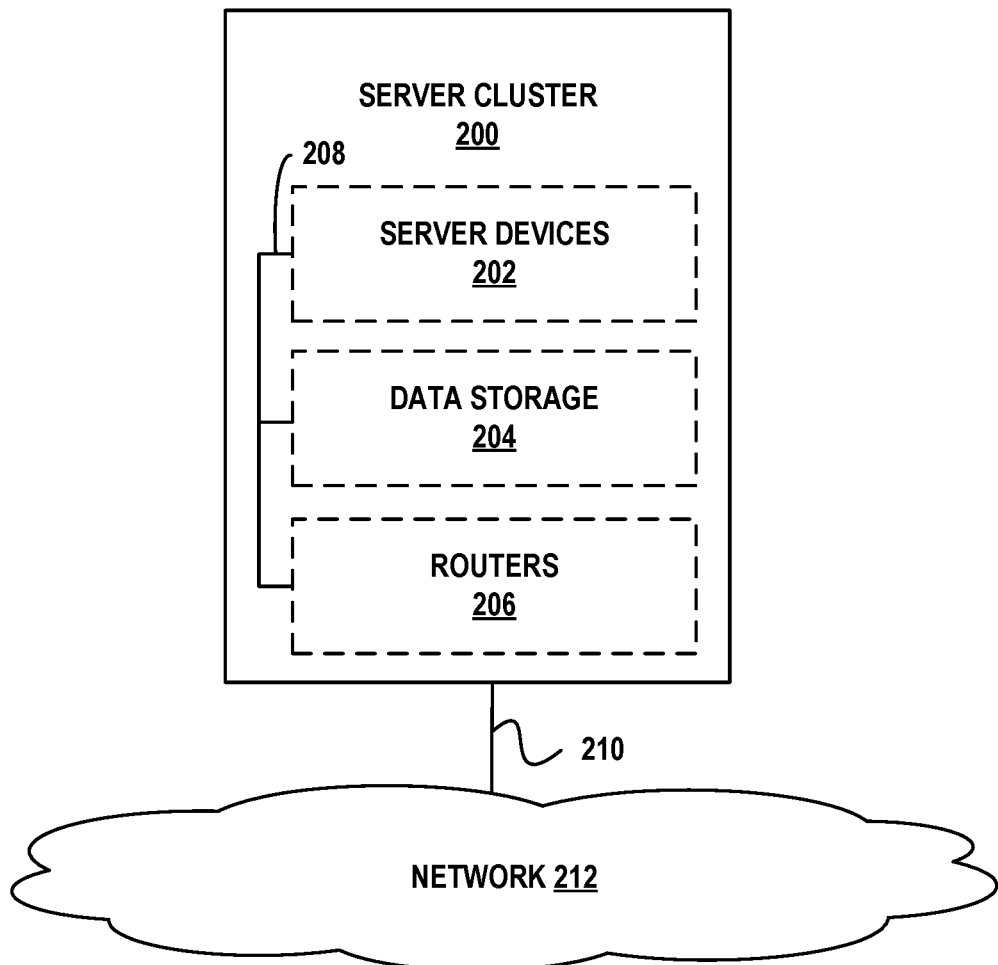
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
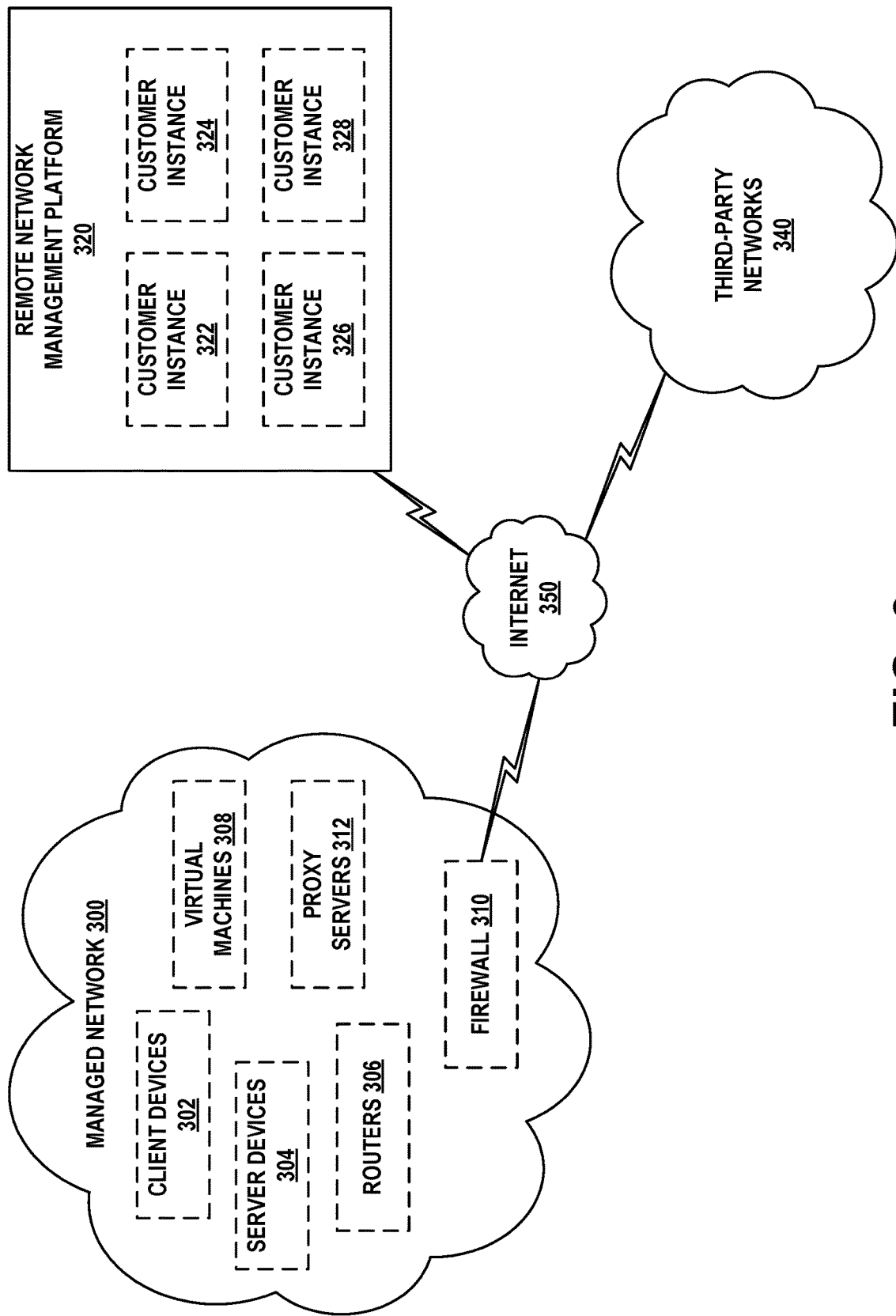
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
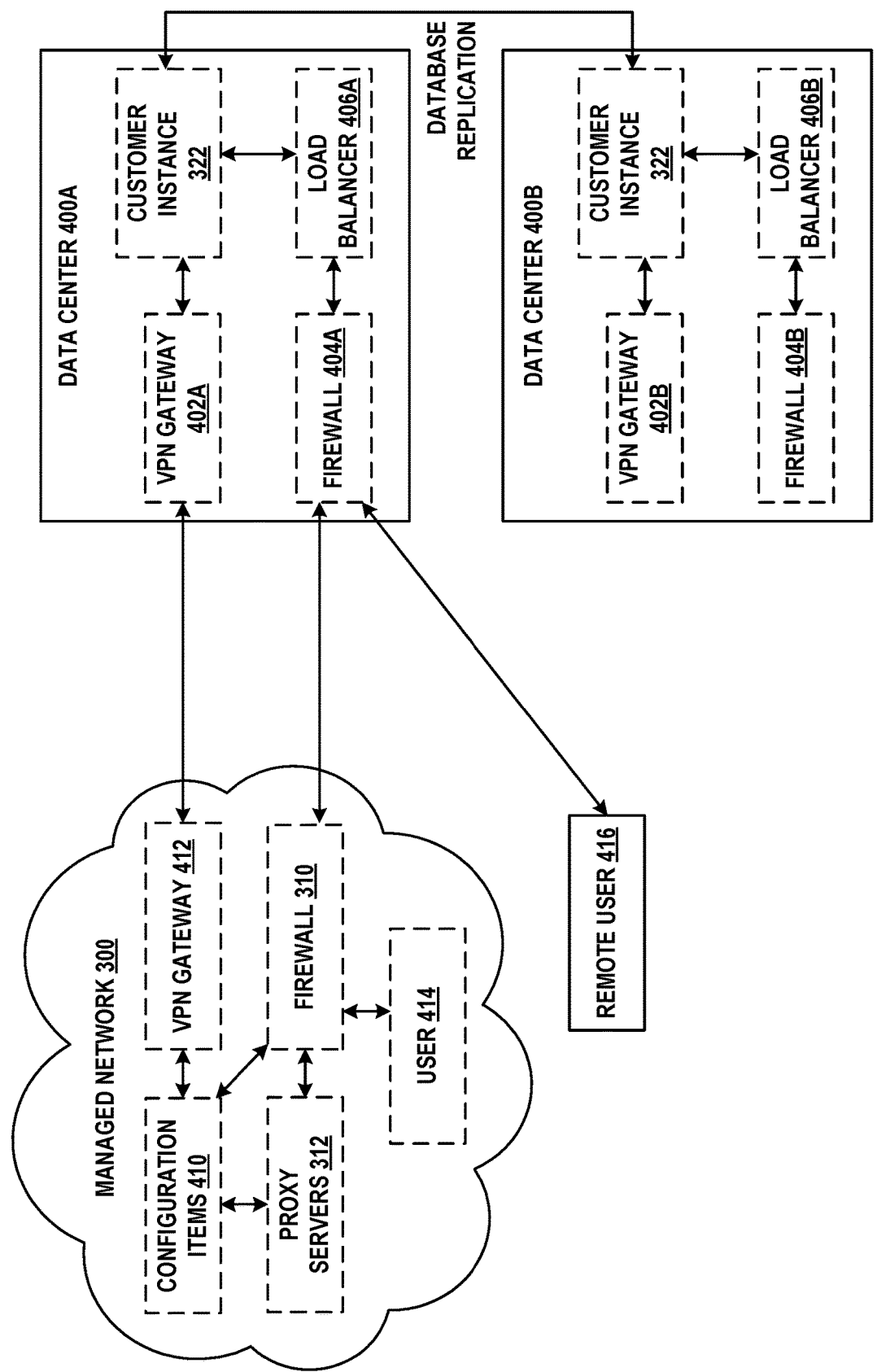
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by customer instance 322, or relationships between discovered devices, applications, and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
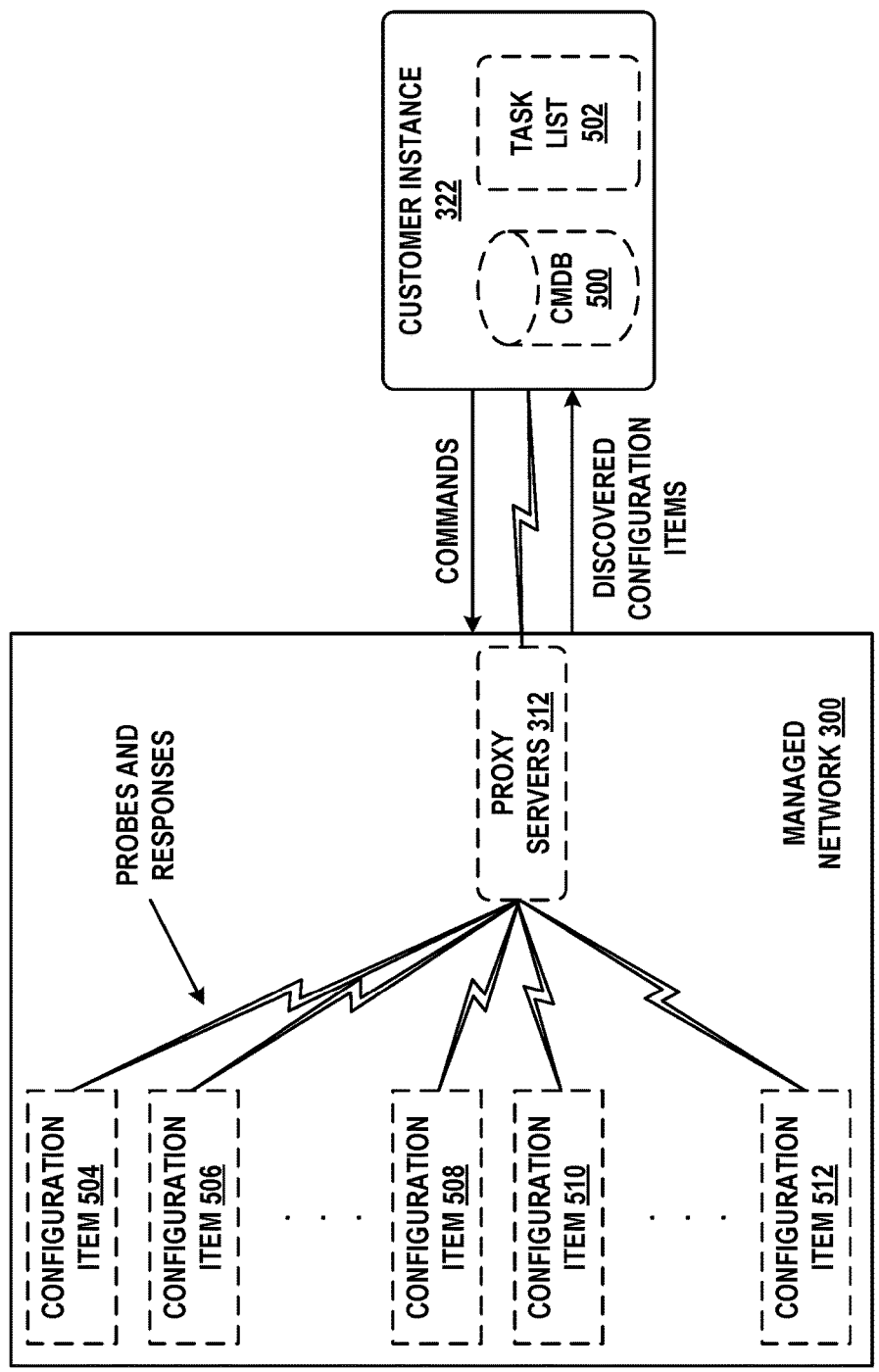
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
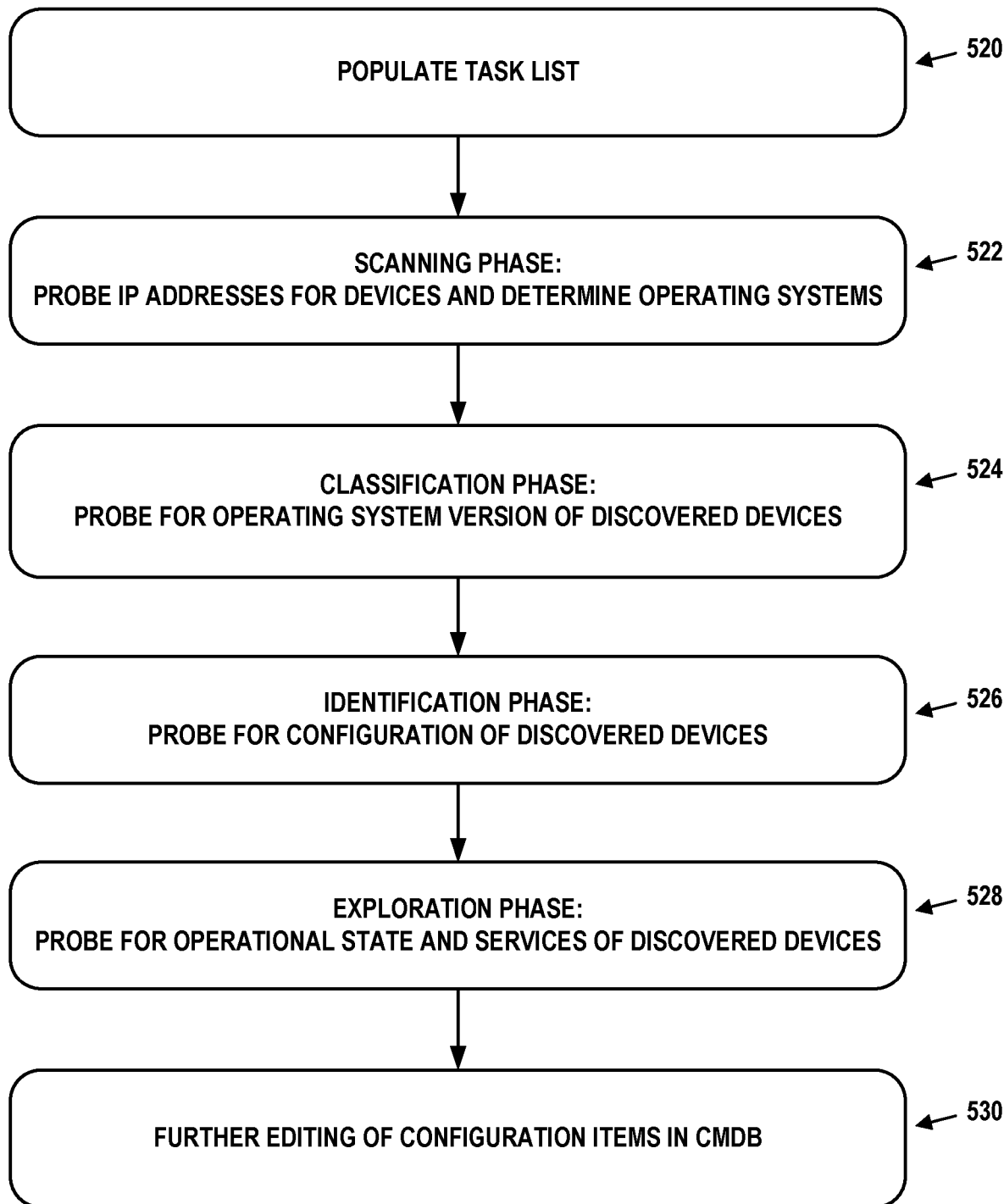
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Performance Indicators and Trigger Configurations

Any of the computing devices in managed network 300 and/or customer instances 322, 324, 326, or 328 may periodically or from time to time take measurements of performance indicators. Examples of performance indications include processor utilization, memory (e.g., main memory) utilization, long-term storage (e.g., disk drive) utilization, network utilization, various types of errors, and so on. Any metric that can be measured by a computing device may be considered a performance indicator.

Typically, a computing device measures its own performance indicators (e.g., computing device A measures the processor utilization of computing device A), but it may be possible for one computing device to measure a performance indicator of another computing device (e.g., computing device A measures the response time of computing device B). Other examples are possible.

In some cases, measurements of performance indicators may take the form of a percentage. For example, processor utilization measurements may be in the range of 0% to 100%, where a higher value indicates a greater extent of utilization. On the other hand, measurements of other types of performance indicators may take the form of absolute, relative, or normalized values. For instance, uptime measurements that indicate the amount of time since a computing device was last turned on or rebooted could take the form of a number of seconds.

Regardless of how performance indicators are gathered or expressed, they may be used to obtain information regarding the operation, health, and/or status of one or more computing devices. As an example, based on a series of measurements of the utilization or remaining space of a long-term storage device, a linear prediction (e.g., based on linear regression, for instance) can be made of when the long-term storage device will be at full capacity, or when its capacity will likely cross some other threshold (e.g., 80% full). As a result of analyzing a measured performance indicator in this fashion, actions may be taken. As just one example, the long-term storage device may be re-provisioned with a greater amount of storage, or some of the tasks that the computing device is carrying out may be reassigned to other computing devices. Consequently, such measurements can be an important tool in managing the operation of computing devices, networks, and enterprises.

In determining whether to take an action, one or more measurements of one or more performance indicators may be considered. When these measurements meet the specification of a pre-defined trigger configuration, a "transition" is said to occur. As a result of a transition being observed, a particular action may take place (e.g., logging an error message, alerting a user, refusing to accept additional transactions, and so on). The trigger configurations may define a particular state of a computing device or system, or a state transition from one particular state to another particular state, both of which may be called "transitions" for sake of simplicity.

Three example types of trigger configurations are described below. Nonetheless, there may be additional types of trigger configurations.

A first type of trigger configuration may represent a computing device or system being in a particular state. For instance, the trigger configuration may be defined to represent that processor utilization is over 85%. This type of trigger configuration may be determined by considering a single measurement. For instance, if processor utilization is measured once every 10 seconds, each such measurement may be compared to a trigger configuration of the first type (e.g., is the measured value over 85%), and a transition may occur if this condition is satisfied.

A second type of trigger configuration may represent a computing device or system moving from one state to another state. For instance, the trigger configuration may be defined to represent that processor utilization has gone from being 85% or less to over 85%. This type of trigger condition may be determined by a pair of consecutive measurements. For instance, if in one measurement processor utilization is 85% or less and in the next consecutive measurement processor utilization is over 85%, a transition has occurred.

A third type of trigger configuration may involve consideration of a window of two or more measurements of one or more performance indicators. This window may be a sliding window of the most recent measurements. Trigger configurations of this type may be defined in various ways. For example, assuming a window of n processor utilization measurements, a transition may occur if (i) all of the n measurements are over 85%, (ii) at least k of the n measurements are over 85%, where k is less than n, or (iii) the k most recent measurements in the window are over 85% while the other n-k measurements are not, where k is less than n. Other examples are possible.

Furthermore, some trigger configurations may be defined for combinations of performance indicators. As an example, a transition for a trigger configuration of the first type may be defined for when processor utilization is over 85% and utilization of a particular network interface is over 70%. In general, compound trigger configurations may be defined by applying logical operations (e.g., AND, OR, XOR, NOT) to measurements of two or more performance indicators. Such compound trigger configurations may be of the second or third type as well.

Figure 6A:
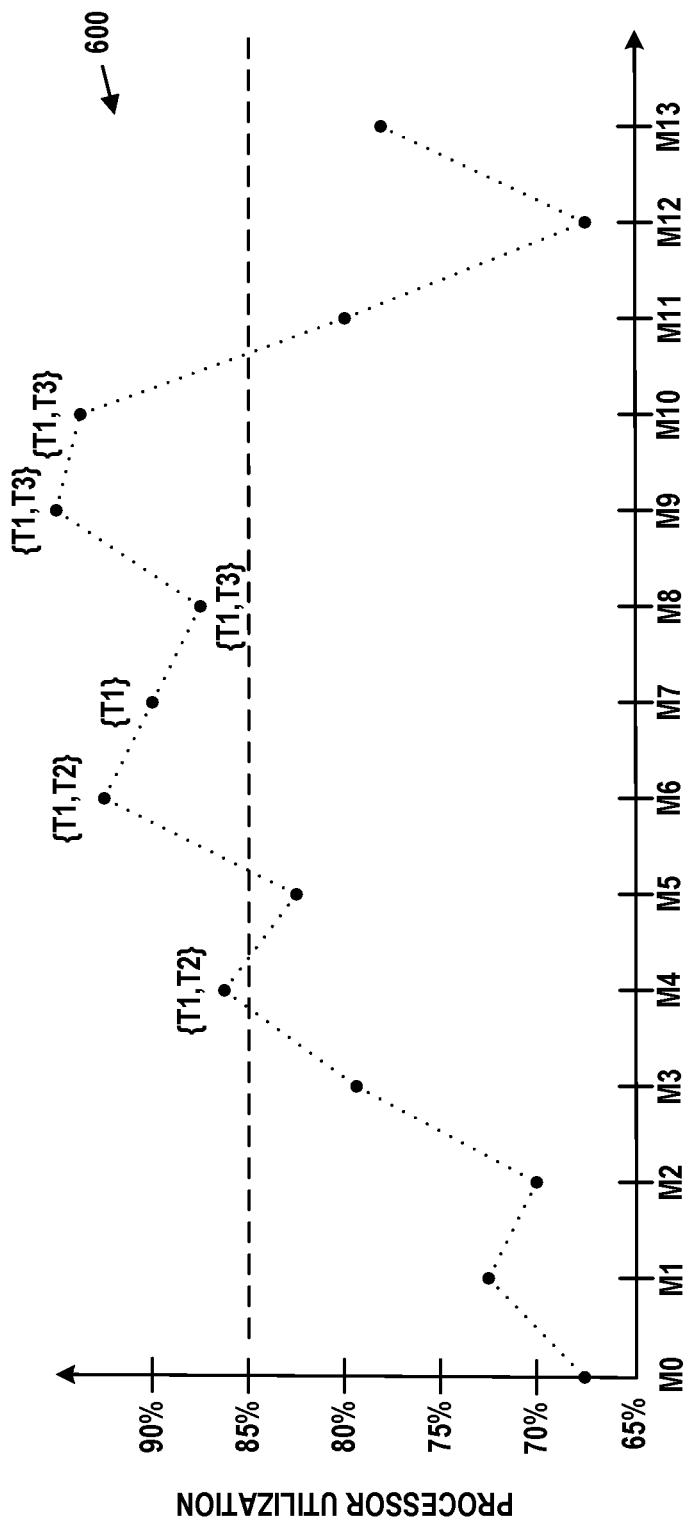
FIG. 6A depicts a time series, in accordance with example embodiments.

FIG. 6A is a graph 600 of 14 consecutive processor utilization measurements. These measurements are assumed to have been taken periodically, a few seconds apart from one another (e.g., with anywhere from 5-20 seconds between each consecutive pair of measurements).

Three trigger configurations are defined. A transition for trigger configuration T1 occurs when the most recent measurement indicates processor utilization above 85%. A transition for trigger configuration T2 occurs when the most recent measurement indicates processor utilization above 85%, and the second-most recent measurement indicates processor utilization at or below 85%. A transition for trigger configuration T3 occurs when the three most recent measurements of processors utilization are all above 85%. Accordingly, trigger configuration T1 is of the first type, trigger configuration T2 is of the second type, and trigger configuration T3 is of the third type.

Graph 600 illustrates various transitions for each of these trigger configurations. The first four measurements of processor utilization (M0-M3) are at or below 85%, and thus do not result in any transitions. Measurement M4 indicates a processor utilization of approximately 86%, which causes transitions for trigger configurations T1 and T2. Measurement M5 indicates a processor utilization of approximately 83%, which does not result in any transitions. Measurement M6 indicates a processor utilization of approximately 92%, which once again causes transitions for trigger configurations T1 and T2. Measurement M7 indicates a processor utilization of approximately 90%, which causes a transition for trigger configuration T1. Measurement M8 indicates a processor utilization of approximately 87%, which causes transitions for trigger configurations T1 and T3. These transitions also occur as a result of measurements M9 and M10. The final three measurements (M11-M13) are all at or below 85% and therefore do not cause any transitions.

FIG. 6B illustrates table 610. This table includes the processor utilization measured for each of M0-M13 in FIG. 6A, as well as the transitions that occurred as a result of pre-defined trigger configurations. Furthermore, data 612 for transitions resulting from M8 is illustrated in detail.

Particularly, data 612 includes a timestamp of when the associated measurement took place (Saturday, Jul. 29, 2017 at 2:16:57 AM), a list of transitions that the measurement caused (T1 and T3), a list of the most recent 5 measurements (e.g., to provide context for the transitions), and one or more codes to be used in associated actions. For instance, the transition for trigger configuration T1 may be a lower-level warning (WARN1) and may be associated with a text string "HIGH CPU". The transition for trigger configuration T3 may be a higher-level warning (WARN2) and may be associated with a text string "SUSTAINED HIGH CPU". These warnings and their text strings may be logged or displayed by actions associated with the transitions.

VI. Example Distributed Detection of Observed Transitions

In conventional systems, a computing device can be configured to take measurements of performance indicators, compare these measurements to thresholds, and then take an action based on the outcome of the comparison. In some scenarios, a network of computing devices may each be configured to take measurements and, when the comparison indicates that one or more measurements are on one side or the other of the threshold (e.g., a transition is observed), transmit an indication of such to a designated server device (e.g., a management console). This server device may log the indication, and may further display the indication (e.g., on a GUI) and/or notify a user.

There are a number of drawbacks and limitations to these conventional systems. For instance, the computing devices may not have the requisite memory or storage resources available to retain more than just a relatively small number of the most recent measurements. Some of these computing devices may be configured to delete some stored measurements after an indication is transmitted to the server device. Also, the computing devices would need to use processing resources to compare measurements to thresholds, which could impede the rate at which these computing devices can carry out their primary tasks. Furthermore the designated server device may only receive the indications, and not the measurements that led up to or resulted in the indication being transmitted. Therefore, in cases where the measurements indicate an error condition or abnormal behavior, it is difficult to determine the root cause of such situations.

The embodiments herein address these disadvantages and improve upon measurement and detection of transitions by distributing the processing between computing devices and a time-series server device. Particularly, the computing devices still take measurements, but transmit a stream of these measurements to the time-series server device for storage and/or further processing. The time-series server device applies trigger configurations to the received stream in order to detect transitions. Observed transitions are stored in transition storage. Then, worker threads on the computing devices may poll and retrieve these observed transitions individually or in bulk.

This distributed mechanism reduces the storage and processing requirements on the computing devices, while allowing the time-series server device to store a larger extent of measurements and observed transitions. In this way, performance of computing devices is improved, while measurements are available for determining potential causes of error conditions and/or unusual behavior, or for other uses.

Figure 7:
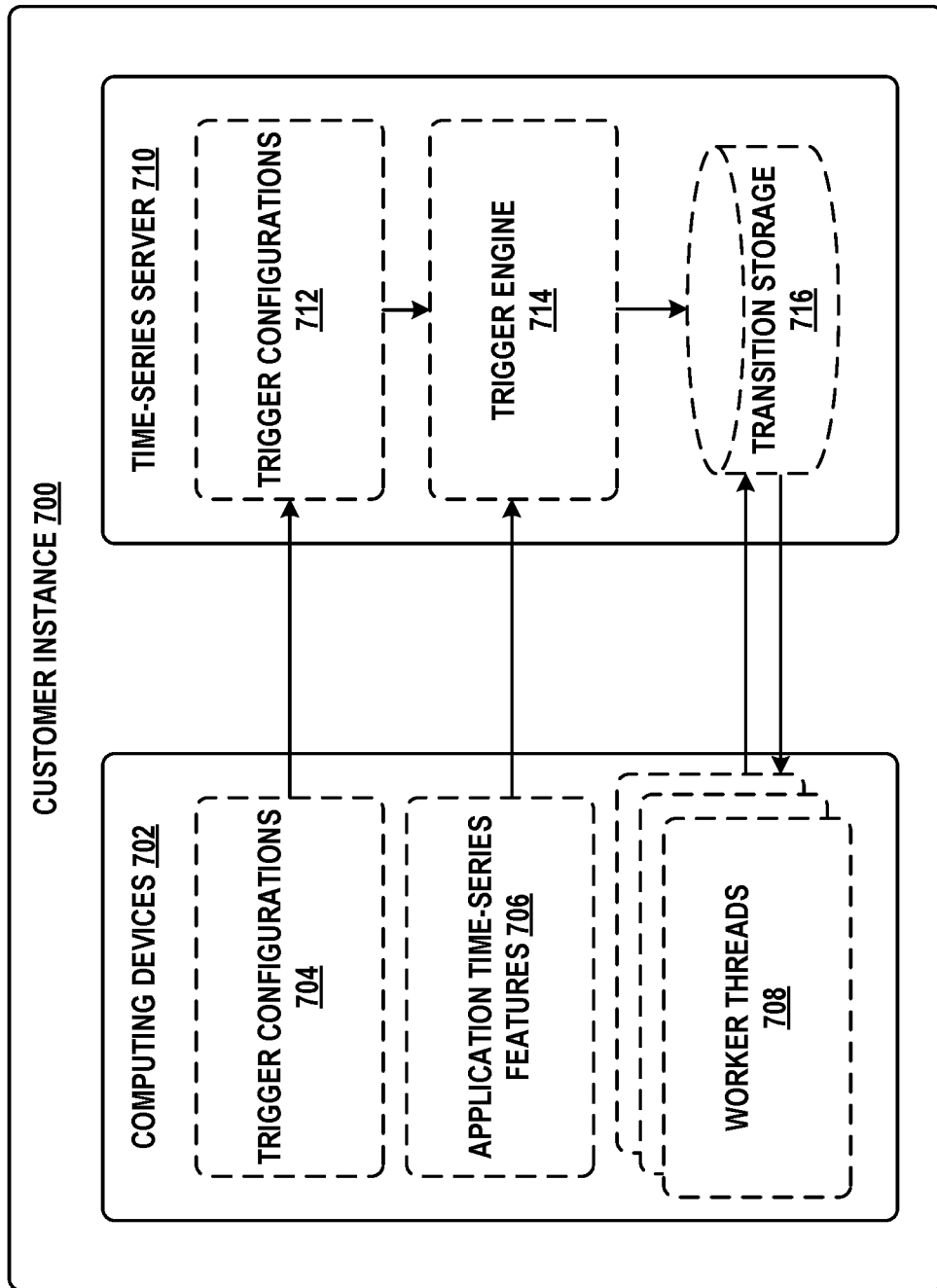
FIG. 7 depicts a distributed architecture for detecting states and state transitions, in accordance with example embodiments.

FIG. 7 depicts a distributed architecture suited to these purposes, including computing devices 702 and time-series server device 710 within customer instance 700. In some embodiments, one or more of computing devices 702 may be disposed within a managed network. Additionally, computing devices 702 may be executing a number of applications (not specifically shown in FIG. 7) that perform operations attributed herein to computing devices 702.

Specifically, computing device 702 may contain one or more trigger configurations 704, application time-series features 706, and worker threads 708. Trigger configurations 704 may be any trigger configuration discussed above, or any other single or compound trigger configuration. As examples, trigger configurations 704 may include trigger configurations of the first type, second types, third type, and/or another type. Computing devices 702 may be configured to transmit trigger configurations 704 to time-series server device 710. These transmissions may occur periodically (e.g., once every few minutes), may be caused by any edits or changes made to trigger configurations 704, and/or may take place for other reasons.

In some cases, a trigger configuration may include a reference to a callback function (e.g., a JavaScript function) that is to be executed when a transition associated with the trigger configuration is observed. Such a callback function may define custom processing that may take place as part of an associated action, and may be defined or referred to in data 612, for example. In the distributed architecture of FIG. 7, callback functions may be performed by computing devices 702 after being retrieved by worker threads 708.

Application time-series features 706 may include any application that takes measurements. As noted above, these measurements may include processor utilization, memory utilization, and/or network utilization measurements. But application time-series features 706 are not limited to taking just these measurements, and measurements of other performance indicators may be taken. Regardless, measurements taken by application time-series features 706 may be transmitted to trigger engine 714 of time-series server 710. These transmissions may take the form of a stream in which computing devices 702 transmit the measurements as they are taken or shortly thereafter.

Worker threads 708 may be one or more applications or processes that are configured to retrieve observed transitions from transition storage 716 of time-series server device 710. Worker threads 708 may do so periodically or from time to time. For instance, a worker thread may be configured to retrieve at most a particular number of observed transitions from transition storage 716 once every 30 seconds. By using multiple worker threads, the processing and communication overhead of the retrieval may be distributed across multiple client devices. Alternatively or additionally, certain worker threads may be configured to only retrieve certain types of observed transitions (e.g., transitions relating to particular computing devices or particular levels of severity).

Time-series server device 710 may be a computing device (e.g., embodied by computing device 100 and/or a cluster of computing devices, such as server cluster 200). In some implementations, time-series server device 710 may be a database with ample capacity for storing measurements and/or observed transitions. Time-series server device 710 may be optimized, or otherwise configured, for efficient storage of this data (e.g., through use of compression).

Time-series server device 710 may contain trigger configurations 712, trigger engine 714, and transition storage 716. Each of these elements may be or may make use of one or more software applications. As noted above, trigger configurations 712 may receive and store copies of trigger configurations 704. Trigger configurations 712 may be stored within time-series server device 710 and provided to trigger engine 714.

Trigger engine 714 may be a software module configured to apply trigger configurations 712 to streams of measurements received from application time-series features 706. For example, trigger engine 714 may receive one or more measurements, and determine whether these measurements meet the criteria set forth in trigger configurations 712. If so, trigger engine 714 may write a representation of the associated transition(s) (e.g., data 612 or a different representation) to transition storage 716.

Trigger engine 714 may be configured to apply some of trigger configurations 712 in real time or near real time, as measurements are received. This nearly instantaneous application of trigger configurations may be referred to as being synchronous. Trigger engine 714 may apply trigger configurations synchronously when trigger engine 714 can do so based entirely on information provided by trigger configurations 712 and recently received measurements. For instance, trigger configurations of the first type and/or the second type may be applied synchronously because these types of trigger configurations can be applied by looking at the most recent or two most recent measurements, as well as trigger configurations 712.

On the other hand, trigger engine 714 may apply more complex trigger configurations asynchronously. For instance, trigger configurations may be applied asynchronously if these trigger configurations require considering any of (i) a window of two or more measurements (e.g., a trigger configuration of the third type), (ii) measurements of two or more performance indicators (e.g., a compound trigger configuration), or (iii) information available from neither the received measurements nor the trigger configurations (e.g., per-computing-device policies).

Put another way, determining whether to apply a particular trigger configuration synchronously or asynchronously may depend on how much processing is expected to be required. If the expected amount of processing is small (e.g., the relevant data to be processed in readily available and not extensive), the trigger configuration may be applied synchronously. But if the expected amount of processing is more extensive, the trigger configuration may be applied asynchronously. The advantage of supporting both synchronous and asynchronous application of trigger configurations is that it allows simple trigger configurations to be applied in real time or near real time, but can delay the processing of complex trigger configurations. The latter can be scheduled for when the load on time-series server device 710 is below a threshold. This way, the processing of more complex trigger configurations does not impede the ability of time-series server device 710 to receive and store measurements.

In any event, transition storage 716 may store representations of observed transitions (e.g., data 612, for example). Transition storage 716 may be configured to receive polling requests from worker threads 708. In response to these requests, transition storage may transmit the observed transitions to worker threads 708. After doing so, transition storage 716 may either delete the representations of the observed transitions, or maintain them in a long-term storage module.

VII. Example Operations

Figure 8:
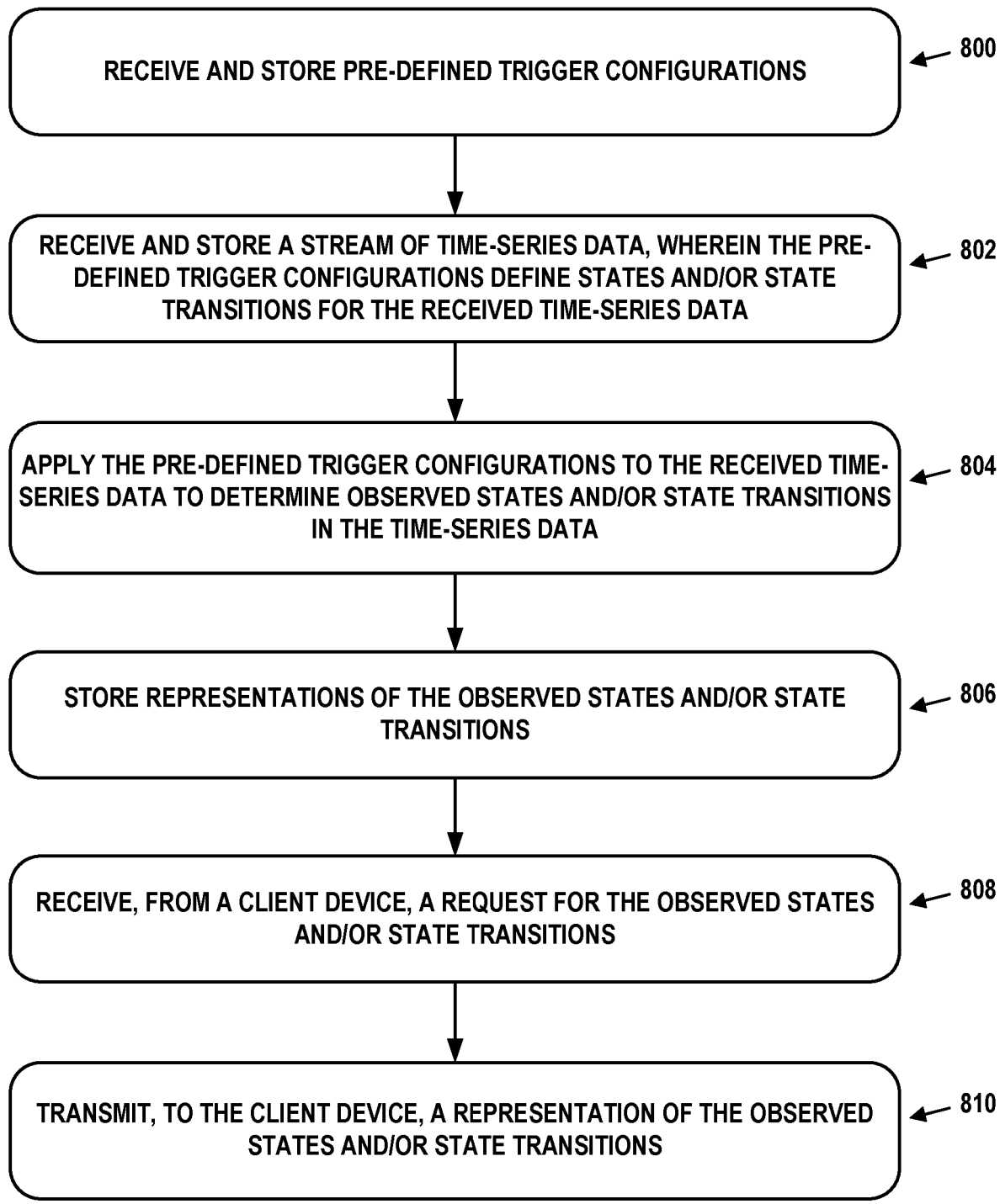
FIG. 8 is a flow chart, in accordance with example embodiments.
Figure 9:
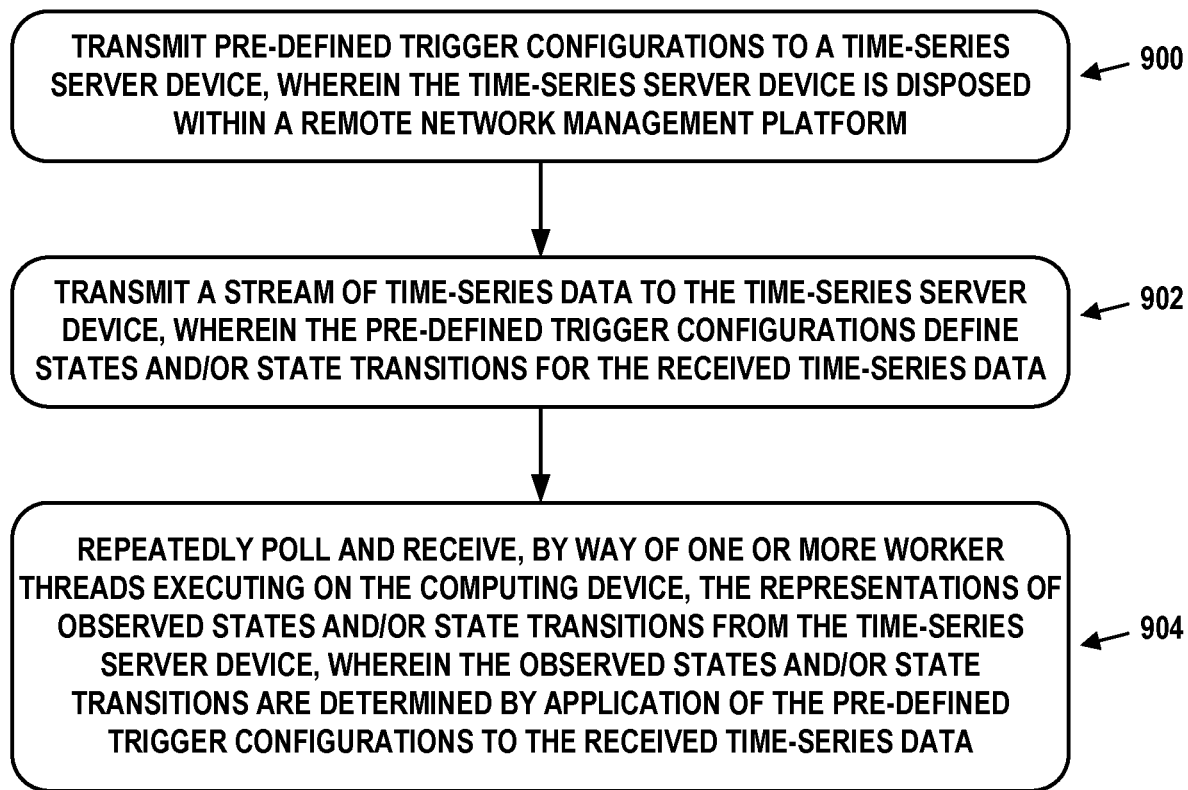
FIG. 9 is a flow chart, in accordance with example embodiments.

FIGS. 8 and 9 are flow charts illustrating example embodiments. The processes illustrated by FIGS. 8 and 9 may be carried out by a computing device, such as computing device 100, and/or a cluster of computing devices, such as server cluster 200. However, the processes can be carried out by other types of devices or device subsystems. For example, the processes could be carried out by a portable computer, such as a laptop or a tablet device.

The embodiments of FIGS. 8 and 9 may be simplified by the removal of any one or more of the features shown therein. Further, these embodiments may be combined with features, aspects, and/or implementations of any of the previous figures or otherwise described herein.

FIG. 8 illustrates a process that may be carried out by a time-series server device. Nonetheless, other types of devices may perform this process or similar processes.

Block 800 may involve receiving and storing pre-defined trigger configurations. Block 802 may involve receiving and storing a stream of time-series data. The pre-defined trigger configurations may define states and/or state transitions for the received time-series data.

Block 804 may involve applying, by way of a trigger engine, the pre-defined trigger configurations to the received time-series data to determine observed states and/or state transitions in the time-series data. Block 806 may involve storing, in transition storage, representations of the observed states and/or state transitions.

Block 808 may involve receiving, from a client device, a request for the observed states and/or state transitions. Block 810 may involve transmitting, to the client device, a representation of the observed states and/or state transitions.

In some embodiments, the pre-defined trigger configurations and the stream of time-series data are received from the client device.

In some embodiments, the time-series data includes, for a particular computing device of the computing devices, measurements of a performance indicator. A particular trigger configuration of the pre-defined trigger configurations may define a state and/or state transition in which the performance indicator crosses a threshold value.

In some embodiments, the time-series data includes, for a particular computing device of the computing devices, measurements of a performance indicator. A particular trigger configuration of the pre-defined trigger configurations may define a state and/or state transition in which the performance indicator is on one side of a threshold value for m measurements out of a previous n consecutive measurements.

In some embodiments, applying the pre-defined trigger configurations to the received time-series data may involve synchronously applying a first set of the pre-defined trigger configurations and asynchronously applying a second set of the pre-defined trigger configurations. The first set of the pre-defined trigger configurations may be applied using the received time-series data and thresholds defined in the first set of the pre-defined trigger configurations. The second set of the pre-defined trigger configurations may use information available to the time-series server device but not available in the time-series data nor the second set of the pre-defined trigger configurations.

In some embodiments, applying the pre-defined trigger configurations to the received time-series data involves synchronously applying a first set of the pre-defined trigger configurations and asynchronously applying a second set of the pre-defined trigger configurations. The first set of the pre-defined trigger configurations may be applied using respective individual measurements in the received time-series data. The second set of the pre-defined trigger configurations may respectively use a plurality of individual measurements in the received time-series data.

In some embodiments, each of the pre-defined trigger configurations is respectively associated with a callback function. Applying the pre-defined trigger configurations to the received time-series data may involve calling the callback function associated with a particular trigger configuration of the pre-defined trigger configurations when the state and/or state transition of the particular trigger configuration is observed.

In some embodiments, a particular trigger configuration of the pre-defined trigger configurations is based on a linear prediction of a trend in the time-series data. The linear prediction may estimate a future time at which values of the time series data is expected to cross a pre-determined threshold.

FIG. 9 illustrates a process that may be carried out by a computing device in communication with a time-series server device. This computing device may be disposed within a managed network or a remote network management platform. Nonetheless, other types of devices may perform this process or similar processes. The embodiments of FIG. 9 may be enhanced with any feature described in the context of FIG. 8 or any other previous Figure.

Block 900 may involve transmitting pre-defined trigger configurations to a time-series server device. The time-series server device may be disposed within a remote network management platform.

Block 902 may involve transmitting a stream of time-series data to the time-series server device. The pre-defined trigger configurations may define states and/or state transitions for the received time-series data.

Block 904 may involve repeatedly polling and receiving, by way of one or more worker threads, the representations of observed states and/or state transitions from the time-series server device. The observed states and/or state transitions may be determined by application of the pre-defined trigger configurations to the received time-series data.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
   a time-series server device disposed within the computing system, wherein the time-series server device is configured to:
      receive and store pre-defined trigger configurations,
      receive and store time-series data, wherein the pre-defined trigger configurations define states and state transitions for the received time-series data, apply, by way of a trigger engine, the pre-defined trigger configurations to the received time-series data to determine observed states and state transitions in the time-series data, comprising:

synchronously applying, by way of a trigger engine, a first set of the pre-defined trigger configurations to the received time-series data to determine observed states and state transitions in the time-series data, wherein the first set of the pre-defined trigger configurations can be applied using the received time-series data and thresholds defined in the first set of the pre-defined trigger configurations, and asynchronously applying, by way of the trigger engine, a second set of the pre-defined trigger configurations to the received time-series data to determine observed states and state transitions in the time-series data, wherein the second set of the pre-defined trigger configurations uses information available to the time-series server device but not available in the time-series data nor the second set of the pre-defined trigger configurations, and store, in transition storage, representations of the observed states and state transitions; and one or more applications operating on computing devices disposed within the computing system, wherein the one or more applications are configured to:

transmit the pre-defined trigger configurations to the time-series server, transmit a stream of the time-series data to the time-series server, and repeatedly poll and receive, by way of a plurality of worker threads, the representations of the observed states and state transitions from the transition storage.

2. The computing system of claim 1, wherein the time-series server device is part of a remote network management platform that manages a managed network.

3. The computing system of claim 2, wherein at least some of the computing devices are disposed within the remote network management platform.

4. The computing system of claim 2, wherein at least some of the computing devices are disposed within the managed network.

5. The computing system of claim 1, wherein the time-series data includes, for a particular computing device of the computing devices, measurements of a performance indicator, and wherein a particular trigger configuration of the pre-defined trigger configurations defines a state transition in which the performance indicator crosses a threshold value.

6. The computing system of claim 1, wherein the time-series data includes, for a particular computing device of the computing devices, measurements of a performance indicator, and wherein a particular trigger configuration of the pre-defined trigger configurations defines a state transition in which the performance indicator is on one side of a threshold value for m measurements out of a previous n consecutive measurements.

7. The computing system of claim 1, wherein the time-series data includes, for a particular computing device of the computing devices, measurements of a performance indicator, and wherein the performance indicator represents one of processor utilization, memory utilization, or network capacity utilization of the particular computing device.

8. The computing system of claim 1, wherein the first set of the pre-defined trigger configurations can be applied using respective individual measurements in the received time-series data; and wherein the second set of the pre-defined trigger configurations respectively use a plurality of individual measurements in the received time-series data.

9. The computing system of claim 1, wherein each of the pre-defined trigger configurations is respectively associated with a callback function, and wherein applying the pre-defined trigger configurations to the received time-series data comprises calling the callback function associated with a particular trigger configuration of the pre-defined trigger configurations as a result of the state or state transition of the particular trigger configuration being observed.

10. The computing system of claim 1, wherein a particular trigger configuration of the pre-defined trigger configurations is based on a linear prediction of a trend in the time-series data, wherein the linear prediction estimates a future time at which values of the time series data is expected to cross a pre-determined threshold.

11. A method comprising:

receiving and storing, by a time-series server device disposed within a remote network management platform, pre-defined trigger configurations;

receiving and storing, by the time-series server device, a stream of time-series data, wherein the pre-defined trigger configurations define states and state transitions for the received time-series data;

applying, by way of a trigger engine of the time-series server device, the pre-defined trigger configurations to the received time-series data to determine observed states and state transitions in the time-series data comprising:

synchronously applying, by way of a trigger engine, a first set of the pre-defined trigger configurations to the received time-series data to determine observed states and state transitions in the time-series data, wherein the first set of the pre-defined trigger configurations can be applied using the received time-series data and thresholds defined in the first set of the pre-defined trigger configurations; and asynchronously applying, by way of the trigger engine, a second set of the pre-defined trigger configurations to the received time-series data to determine observed states and state transitions in the time-series data, wherein the second set of the pre-defined trigger configurations uses information available to the time-series server device but not available in the time-series data nor the second set of the pre-defined trigger configurations;

storing, in transition storage of the time-series server device, representations of the observed states and state transitions;

receiving, by the time-series server device and from a client device, a request for the observed states and state transitions; and transmitting, by the time-series server device and to the client device, a representation of the observed states and state transitions.

12. The method of claim 11, wherein the pre-defined trigger configurations and the stream of time-series data are received from the client device.

13. The method of claim 11, wherein the time-series data includes, for a particular computing device of the computing devices, measurements of a performance indicator, and wherein a particular trigger configuration of the pre-defined trigger configurations defines a state transition in which the performance indicator crosses a threshold value.

14. The method of claim 11, wherein the time-series data includes, for a particular computing device of the computing devices, measurements of a performance indicator, and wherein a particular trigger configuration of the pre-defined trigger configurations defines a state transition in which the performance indicator is on one side of a threshold value for m measurements out of a previous n consecutive measurements.

15. The method of claim 11,
   wherein the first set of the pre-defined trigger configurations can be applied using respective individual measurements in the received time-series data; and
   wherein the second set of the pre-defined trigger configurations respectively use a plurality of individual measurements in the received time-series data.

16. The method of claim 11, wherein each of the pre-defined trigger configurations is respectively associated with a callback function, and wherein applying the pre-defined trigger configurations to the received time-series data comprises calling the callback function associated with a particular trigger configuration of the pre-defined trigger configurations when the state or state transition of the particular trigger configuration is observed.

17. The method of claim 11, wherein a particular trigger configuration of the pre-defined trigger configurations is based on a linear prediction of a trend in the time-series data, wherein the linear prediction estimates a future time at which values of the time series data is expected to cross a pre-determined threshold.

18. A method comprising:
   transmitting, by a computing device, a first set of pre-defined trigger configurations and a second set of pre-defined trigger configurations to a time-series server device, wherein the time-series server device is disposed within a remote network management platform;
   transmitting, by the computing device, a stream of time-series data to the time-series server device, wherein the first set of pre-defined trigger configurations and second set of pre-defined trigger configurations define states and state transitions for the received time-series data; and
   repeatedly polling and receiving, by way of one or more worker threads executing on the computing device, the representations of observed states and state transitions from the time-series server device, wherein the observed states and state transitions are determined by;
      synchronously applying, by way of a trigger engine, the first set of pre-defined trigger configurations to the received time-series data to determine observed states and state transitions in the time-series data, wherein the first set of the pre-defined trigger configurations can be applied using the received time-series data and thresholds defined in the first set of the pre-defined trigger configurations; and
      asynchronously applying, by way of the trigger engine, the second set of pre-defined trigger configurations to the received time-series data to determine observed states and state transitions in the time-series data, wherein the second set of the pre-defined trigger configurations uses information available to the time-series server device but not available in the time-series data nor the second set of the pre-defined trigger configurations.

\* \* \* \* \*